US006452878B1

(12) United States Patent
Graffouliere (10) Patent No.: US 6,452,878 B1
(45) Date of Patent: Sep. 17, 2002

(54) METHOD AND DEVICE FOR CONTROLLING THE POSITION OF AN OPTICAL BEAM INCIDENT ON A TRACK OF A MOBILE CARRIER

(75) Inventor: Philippe Graffouliere, Grenoble (FR)

(73) Assignee: STMicroelectronics, S.A., Montrouge (FR)

( * ) Notice: Subject to any disclaimer, the term of this patent is extended or adjusted under 35 U.S.C. 154(b) by 23 days.

(21) Appl. No.: 09/782,711

(22) Filed: Feb. 13, 2001

(30) Foreign Application Priority Data

Feb. 23, 2000 (FR) .............................. 00 02263

(51) Int. Cl.[7] .............................................. G11B 7/00
(52) U.S. Cl. ............................. 369/44.34; 369/59.21; 369/124.01
(58) Field of Search .................... 369/44.34, 44.28, 369/44.27, 46.41, 47.1, 53.1, 53.34, 59.1, 59.21, 59.22, 124.01, 124.05, 44.35

(56) References Cited

U.S. PATENT DOCUMENTS 4,744,069 A * 5/1988 Sugiyama et al. ....... 369/44.29
5,490,133 A * 2/1996 Nakamura et al. ... 369/44.28 X
5,933,397 A * 8/1999 Yamashita et al. ....... 369/44.28
5,956,304 A   9/1999 Supino et al. ........... 369/44.34

* cited by examiner

Primary Examiner—Muhammad Edun
(74) Attorney, Agent, or Firm—Lisa K. Jorgenson.; Allen, Dyer, Doppelt, Milbrath & Gilchrist, P.A.

(57) ABSTRACT

A method for controlling the position of an optical beam incident on a track of a rotationally mobile carrier of information, such as a disc, includes picking up a beam reflected by the disc using an optical pick-up and determining a positioning error of the beam with respect to the track. The pick-up may include several photodetectors each providing an elementary signal, and the positioning error may be determined from the elementary signals. More precisely, from the elementary signals two sampled secondary signals whose mutual time gap is representative of the positioning error of the beam with respect to the track may be formulated. Furthermore, successive current values of the mutual time gap may be determined at the sampling frequency by searching at the sampling frequency for a successive current maximum of the cross-correlation function between the two sampled secondary signals. The present invention may be particularly applicable to multifunction digital disc (e.g., DVD) readers, for example.

35 Claims, 5 Drawing Sheets

METHOD AND DEVICE FOR CONTROLLING THE POSITION OF AN OPTICAL BEAM INCIDENT ON A TRACK OF A MOBILE CARRIER

FIELD OF THE INVENTION

The present invention relates to the field of digital storage devices, and, more particularly, to controlling the position of a beam incident on a track of a rotationally mobile carrier. Moreover, the invention relates to the control and the determination of a position error of the incident beam with respect to the track.

BACKGROUND OF THE INVENTION

The invention may advantageously (but not exclusively) be applied to digital discs, in particular to multifunction digital discs such as Digital Versatile Discs (DVDs), for example, for storing image data in a compressed manner.

A digital disc includes a single spiral track whose relief is representative of binary information stored on the track of the disc. The track of the disc is illuminated by an incident optical beam (e.g., a laser spot) and several photodetectors (e.g., four) detect the reflections of the light beam on the disc. The optical pick-up formed by the photodetectors then delivers four elementary signals each provided by a respective photodetector. It also delivers an overall or useful signal that is equal to the sum of the four elementary signals. The binary information read on the track is extracted from the useful signal.

Slaving of the optical beam to the track of the rotationally mobile disc is performed exclusively on the basis of the four elementary signals delivered by the photodetectors. More precisely, the signals are summed in pairs to form two signals which are equalized in an analog equalizer before being shaped, by comparison with a threshold, in two comparators. The two signals thus shaped are mutually phase shifted if the laser spot is not situated on the track. The phase difference between these two signals is then detected, and this phase difference is in fact a mutual time gap between these two signals. The time gap corresponds to the positioning error of the beam with respect to the track. This positioning error is then conventionally used in a servocontrol loop to modify the incident optical system and slave the optical beam back to the track.

Such a prior art device includes a considerable number of analog components which may be relatively bulky. Moreover, as technology advances, the modification and production of new components of the device require considerable design and production time. Additionally, when a track jump instruction is received there may be an abrupt movement of the incident beam from one portion of the track situated somewhere on the disc to another portion of the track situated elsewhere on the disc. This may occur, for example, where a portion is situated further outboard or further inboard, and results in the slaving being released. Also, between the time of instruction and the moment at which the carriage bearing the optical system actually starts, one no longer knows the direction in which the track portions are overstepped. This is especially true if the disc exhibits an eccentricity.

To remedy this, a signal known in the art as a "mirror signal" may be calculated from the lower amplitude of the useful signal. More precisely, the bottom envelope of the useful signal is compared with a threshold to yield the mirror signal. Also, the mirror signal thus obtained is always in phase quadrature with respect to a binary signal representing overstepping of a portion of the track. A determination of the sign of the phase difference between the mirror signal and the track overstepping signal yields the direction of overstepping of the track. Even so, it is difficult to perform a large number of processings on these two signals, in particular filterings, due to the risk of disturbing the phase relationship. Moreover, it is also difficult to effectively fix the threshold of comparison of the bottom envelope of the useful signal.

SUMMARY OF THE INVENTION

An object of the invention is to improve accuracy in determining the positioning error while reducing the need for devices such as analog equalizers.

Another object of the invention is to determine the direction of overstepping of a portion of the track without requiring the creation of a mirror signal.

These and other objects, features, and advantages in accordance with the present invention are provided by a method for controlling the position of an optical beam incident on a track of a mobile carrier of information which in particular uses a cross-correlation function between two mutually phase-shifted sampled signals. The search for the maximum of the cross-correlation function will yield, at each current instant, the current value of the phase shift between the two signals. That is, it yields the current value of the time gap between these two signals.

More precisely, the method is for controlling the position of an optical beam incident on a track of a rotationally mobile carrier of information in which the beam reflected by the disc is picked up by an optical pick-up. The optional pick-up may include several photodetectors respectively delivering several elementary signals. The positioning error of the beam with respect to the track is determined from the elementary signals.

Two sampled signals (hereinafter "secondary signals") have a mutual time gap representative of the positioning error of the beam with respect to the track. The secondary signals and the successive current values of the mutual time gap are determined at the sampling frequency by searching, at the sampling frequency, for the successive current maximum of the cross-correlation function between the two sampled secondary signals.

The method according to the invention is an essentially arithmetic optimum process which leads to improved performance and which is also less sensitive to noise. Moreover, the cross-correlation function operates on the entirety of the sampled signals and not merely on the transitions of these sampled signals (where a transition is the overstepping by a predetermined threshold (e.g., the zero value) of the sampled signal), as previously described in French patent application no. 9903237 assigned to the present assignee. The process according to the invention therefore also alleviates the problem of estimating the temporal instants of these transitions.

Each current maximum of the cross-correlation function may be searched for on the basis of a set of samples of this cross-correlation function corresponding respectively to a predetermined set of values of reference time gaps. Stated otherwise, the integration of the cross-correlation function is restricted to a window. The value of the time gap corresponding to the current maximum may be determined, and this value yields the current value of the mutual time gap between the two sampled secondary signals.

Each reference time gap may advantageously be an integer multiple of a base time gap whose value depends on the frequency band occupied by the two sampled secondary signals. Moreover, one of the reference time gaps may be zero and the others pairwise equal and of opposite sign.

The frequency band occupied by the two secondary signals may be proportional to the speed of rotation of the portion of the track read. Thus, this base time gap is not the same for speeds of 1× and 16× (where a speed of rotation of 1× corresponds to 4 m/s). In general, the choice of the value of this base time gap is not critical to the invention, but an inappropriate value may lead to degraded performance. A person skilled in the art will be able to adjust the value of this base time gap, as well as the number of samples of the cross-correlation function, to cover all the possible time gaps between the two sampled signals and also to obtain a cross-correlation function which is neither under- nor over-sampled.

The number of reference time gaps may be equal to five, and the base time gap chosen may be advantageously less than the inverse of the width of the frequency band. The determination of the value of the time gap corresponding to a current maximum may include selecting, from among the samples of the cross-correlation function, of that one having the largest value and of the two samples flanking it. This determination also includes a parabolic interpolation between the three selected values and the calculation of the ratio between two factors resulting from this parabolic interpolation.

It should be noted here that using parabolic interpolation requires a minimum of three values of the cross-correlation function. This being so, in the case where only three values of the cross-correlation function are used (corresponding to a set of three reference time gaps), a value of the base time gap is preferably chosen which is large enough to determine the maximum of this cross-correlation function. In the case where five samples are used, the value of the base time gap may be smaller.

A first binary output signal representative of the possible overstepping of the track by the incident signal is thus formulated on the basis of the numerators of the successive ratios. A second binary output signal representative of the direction of overstepping of the track by the incident signal is formulated on the basis of the numerators and of the denominators of the successive ratios.

A device for controlling the position of an optical beam incident on a track of a rotationally mobile carrier according to the invention includes a pick-up able to pick up the beam reflected by the disc. The pick-up may include several photodetectors. The device also includes a controller or control means able to determine the positioning error of the beam with respect to the track from the elementary signals respectively delivered by the photodetectors.

More specifically, the control means may include a pre-processor or preprocessing means able to formulate, from the elementary signals, two secondary signals sampled by a sampling clock signal. A mutual time gap between the two sampled secondary signals may be representative of the positioning error of the beam with respect to the track. Furthermore, the control means also include a cross-correlator or cross-correlation means able to perform, at the signal sampling frequency, the cross-correlation function between the two sampled secondary signals, and a processor or processing means able to determine the successive current values of the mutual time gap. This may be done by searching, at the sampling frequency, for the successive current maximums of the cross-correlation function between the two sampled secondary signals.

Furthermore, the cross-correlation means may include two inputs for respectively receiving the two sampled secondary signals and a set of multipliers connected to the two inputs by a delay circuit or means and respectively delivering a set of sampled intermediate signals. The set of sampled intermediate signals respectively corresponding to the products of the temporally mutually shifted sampled secondary signals multiplied by reference time gaps. The cross-correlation means may further include a set of low-pass filters respectively connected to the outputs of the various multipliers and a storage device or means connected to the outputs of the low-pass filters and able to store the successive sets of samples of the cross-correlation function respectively associated with the various reference time gaps.

The processing means may thus search for each current maximum of the cross-correlation function based upon each set of samples stored in the storage means and to determine the value of the time gap corresponding to this current maximum. This value yields the current value of the time gap between the sampled secondary signals.

The processing means may include a selector or selection means able to select, from among the samples stored in the storage means, a sample having the largest value and the two samples flanking it. The processing means may also include an interpolater or interpolation means able to perform a parabolic interpolation between the three values selected by the selection means. The processing means may also calculate the ratio between two factors resulting from this parabolic interpolation. This ratio yields the current value of the mutual time gap between the two sampled secondary signals.

The device according to the invention may also advantageously include a post-processor or post-processing means able to formulate, from the numerators of the successive ratios, a first binary output signal representative of the possible overstepping of the track by the incident signal. It may also formulate, from the numerators and from the denominators of the successive ratios, a second binary output signal representative of the direction of overstepping of the track by the incident signal.

A multifunction digital disc reader according to the present invention including a control device as defined above is also provided.

BRIEF DESCRIPTION OF THE DRAWINGS

Other advantages and characteristics of the invention will become apparent upon examining the detailed description of embodiments thereof, given by way of non-limitative example, and the appended drawings in which.

DETAILED DESCRIPTION OF THE PREFERRED EMBODIMENTS

Figure 1:
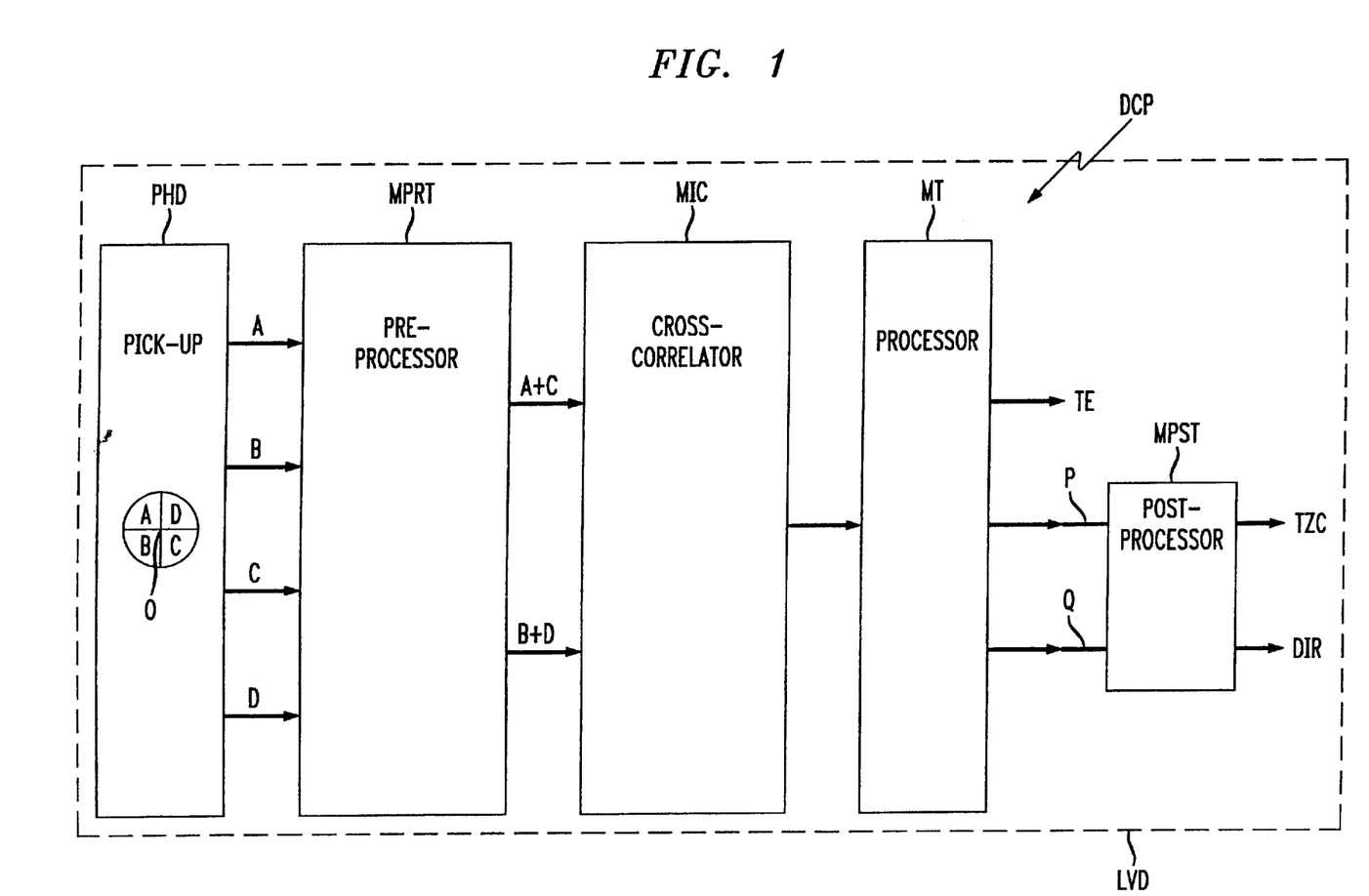
FIG. 1 is a schematic block diagram of a control device according to the invention incorporated into a DVD disc reader.

Turning now to FIG. 1, a positioning control device DCP according to the invention is now described. The positioning control device DCP includes at a front end a pick-up PHD including four photodetectors A, B, C, D. In practice, a laser diode emits a laser beam which is directed towards a face of the disc etched with the track including information. This may be done by way of a splitter plate and a conventional optical system. The beam reflected by the rotating disc then passes through the splitter plate in the other direction and is picked up by the four photodetectors A, B, C, D, all four of which are situated in a plane parallel to the plane of the disc. Each photodetector delivers a signal which has been labeled, for the sake of simplification, by the same letter as that assigned to the photodetectors. These elementary signals A, B, C, D are then processed in a preprocessor or preprocessing means MPRT, essentially including summators and analog digital converters.

More precisely, the two elementary signals delivered by the two photodetectors which are symmetric with respect to the center O of the pick-ups are summed. Thus, one of the secondary signals is equal to the sum of the elementary signals A and C, while the other secondary signal is equal to the sum of the elementary signals B and D. The two secondary signals A+C and B+D are then respectively sampled in two analog-to-digital converters. Of course, it would have been possible to convert each of the elementary signals into digital form and to then sum them.

The references A+C and B+D thus denote two secondary signals sampled after passing through two analog/digital converters controlled by a sampling clock signal, a sampling frequency Fe of which may be equal to 120 MHZ corresponding to a sampling period of the order 8.33 ns, for example. These two sampled secondary signals A+C and B+D are representative of the positioning error TE of the beam with respect to the track.

In the example which will be described below, the value of each sample of a secondary signal is a signed integer represented on seven bits. These two sampled secondary signals are then processed in a cross-correlator or cross-correlation means MIC which will perform, at the sampling frequency, the cross-correlation function between the two sampled secondary signals. Next, a processor or processing means MT will determine the current or successive values of the mutual time gap TE by searching, at the sampling frequency, for the successive current maximums of the cross-correlation function between the two sampled secondary signals.

It will be seen in greater detail below that the search for these maximums includes a parabolic interpolation between three samples of the cross-correlation function. This parabolic interpolation leads to the formulation of two signals P and Q (whose ratio will yield the gap TE). These two sampled signals P and Q are processed in a post-processor or post-processing means MPST which will then deliver a first output signal TZC representative of the overstepping of a portion of track by the incident beam, as well as a second output signal DIR representative of the direction of overstepping.

All of the means of the device DCP according to the invention may advantageously be incorporated into a multifunction digital disc reader LDVD. The cross-correlation function $\Gamma(\tau)$ between two signals x and y is given the following formula:

$$\Gamma(\tau) = \int_{-\infty}^{+\infty} x(t)y(t-\tau)\,dt \tag{I}$$

If, for example, the signal y is a signal which is delayed with respect to the signal x (i.e., if the signal y is a temporally delayed copy of the signal x), the cross-correlation function $\Gamma$ exhibits a maximum for the value of $\tau$ equal to the value of the time gap (delay) between the signals x and y.

In the case of application to the DVD disc, the delay (mutual time gap) between the sampled signals A+C on the one hand and B+D on the other hand is variable. The cross-correlation means MIC will then estimate, at the sampling frequency (i.e., for each pair of samples of the signals A+C and B+D present at the input of the cross-correlation means MIC) the cross-correlation function $\Gamma(\tau)$ for a predetermined set of reference time gaps −2D', −D', 0, D and 2D'. The cross-correlation means MIC will thus, for each pair of samples of the signals A+C and B+D, determine five samples ECH1, ECH2, ECH3, ECH4 and ECH5 of the cross-correlation function corresponding respectively to the five reference time gaps −2D', −D', 0, D', 2D' (FIG. 2a).

The processing means MT will then, for each set of samples ECH1–ECH5, determine the maximum of this cross-correlation function by performing a parabolic interpolation, as will be discussed in greater detail below. The value of the time gap dT of this current maximum MAX (starting from the zero reference time gap as seen in FIG. 2a) is then representative of the current value of the mutual time gap between the two sampled signals A+C and B+D. These operations are repeated upon the appearance of the samples following signals A+C and B+D. Successive values of the mutual time gap TE between the two sampled signals A+C and B+D are therefore obtained at the sampling frequency (i.e., every 8.33 ns in the present case).

Figure 2:
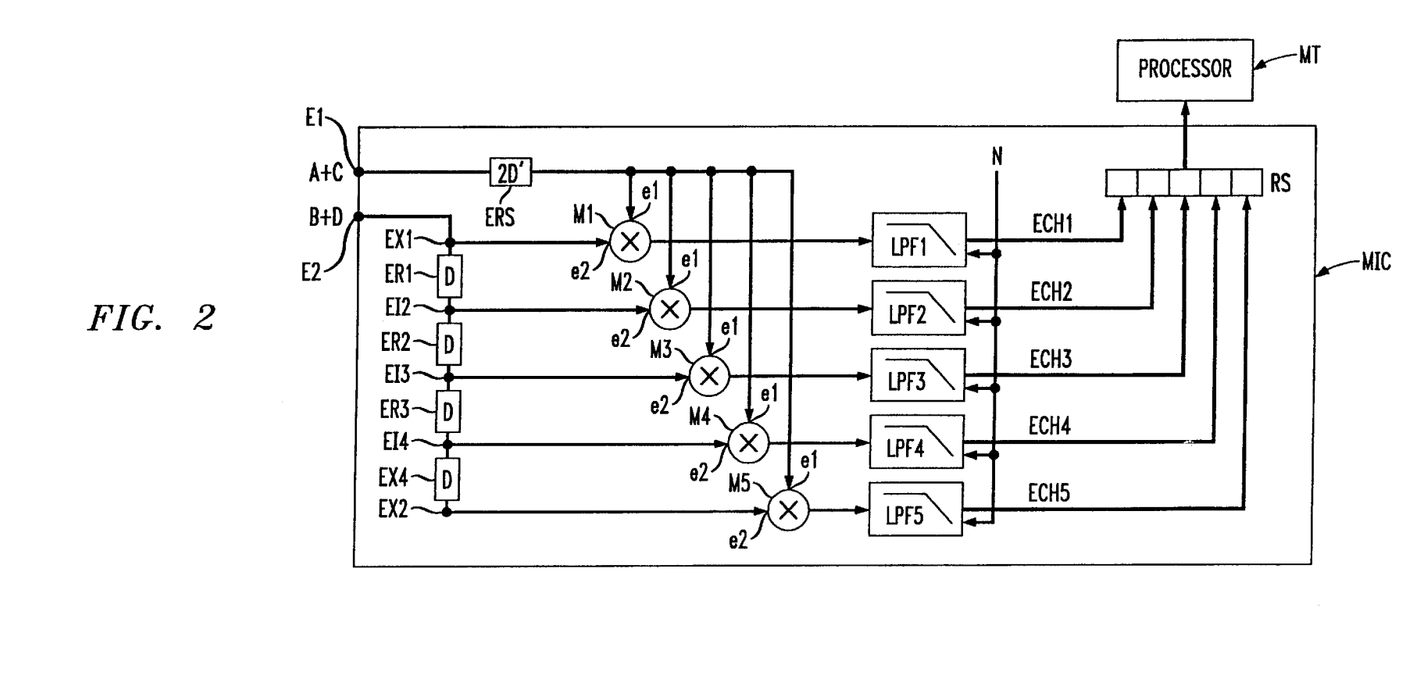
FIG. 2 is a more detailed schematic diagram of the internal architecture of the cross-correlation means of the device of FIG. 1.
Figure 2A:
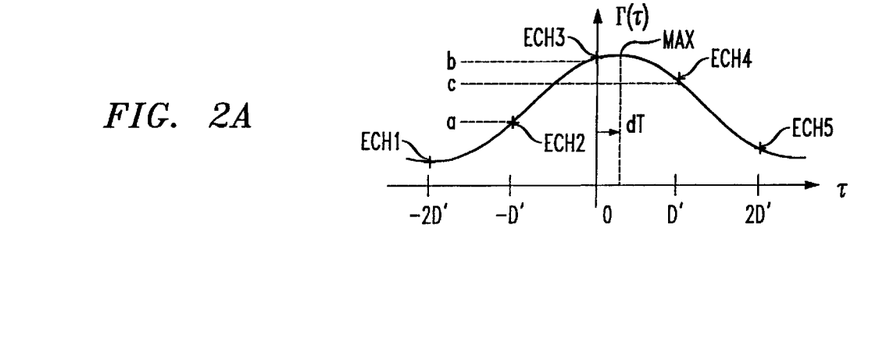
FIG. 2a is a graph of a sampled cross-correlation function effected by the means of FIG. 2.

In the embodiment illustrated in FIG. 2, the cross-correlation means MIC includes two inputs E1, E2 for respectively receiving the two sampled secondary signals A+C and B+D. The cross-correlation means here includes five multipliers M1–M5 each including a first input e1 and a second input e2. The delay means includes a chain of four delay elements ER1–ER4, each defining a delay value equal to the base time gap D'. The delay means also includes an additional delay element ERS defining a delay value 2D' equal to twice the base time gap.

In practice, the value D' of the base time gap is equal to an integer number of sampling periods. For example, for a speed of rotation equal to 2× and a frequency band occupied by the sampled signals equal to 9 MHZ, it will be possible to choose D' equal to the inverse of twice the width of the frequency band, i.e., 1/18 MHZ which is on the order of 55 ns. This corresponds to a base delay equal to six samples (for a sampling frequency of 120 MHZ). Thus, in this case, each delay element ER1 will include 12 flip-flops in series clocked by the sampling signal, while the element ERS will include 24 flip-flops in series clocked by the sampling clock signal.

The first input e1 of each multiplier is linked to the first input E1 of the cross-correlation means by the additional delay element ERS. One of the ends (the end EX1) of the chain of delay elements ER1–ER4 and the second input e2 of one of the multipliers (here the multiplier M1) are directly connected to the second input e2 of the cross-correlation means. The second input e2 of another multiplier (here the multiplier M5) is connected to the other end EX2 of the chain of delay elements. Moreover, the respective second inputs e2 of the other three multipliers M2, M3 and M4 are respectively connected to the three intermediate points EI2, EI3 and EI4 of the chain of delay elements.

The respective outputs of the five multipliers M1–M5 are connected to five low-pass digital filters LPF1–LPF5, which may be of a structure known in the art. All these low-pass filters carry out the integration present in the formula for the cross-correlation function. Each low-pass filter is here a first-order recursive filter. The parameter N defines the cutoff frequency of the filter, i.e., the integration time of the correlator. In the present case, the value 64 has been chosen for N to confer a cutoff frequency of 300 KHz. The outputs of the low-pass filters yield the five samples ECH1–ECH5 of the cross-correlation function. These samples are stored in a storage device or means RS including, for example, five flip-flops. In the example described, each sample is a 14-bit word.

Figure 3:
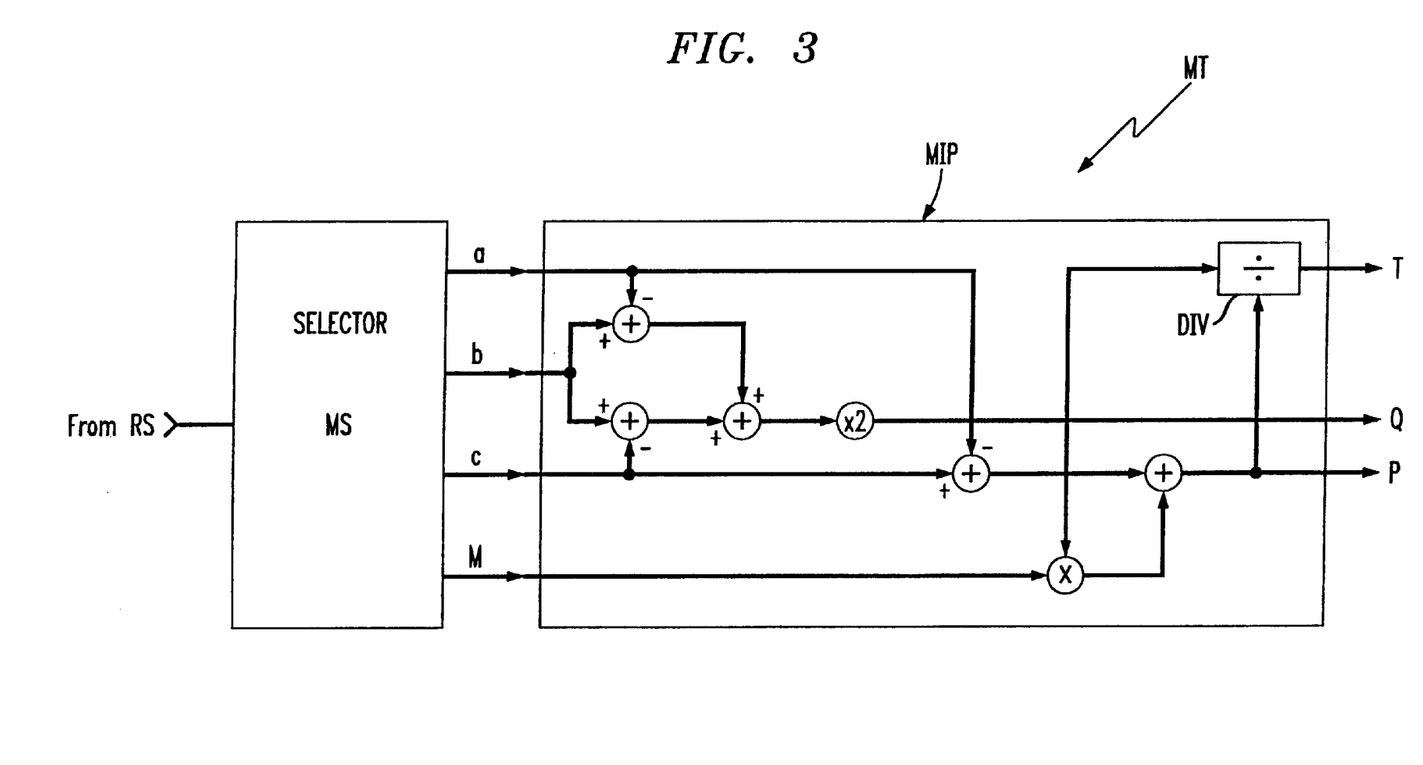
FIG. 3 is a more detailed schematic diagram of the internal architecture of the processing means of the device of FIG. 1.

Reference will now be made more particularly to FIG. 3 to describe the architecture of the processing means MT. The latter includes selector or selection means MS able to select, from among the samples stored in the storage means RS, a sample b having the largest value and two samples a, c flanking it (see FIG. 2a).

Figure 4:
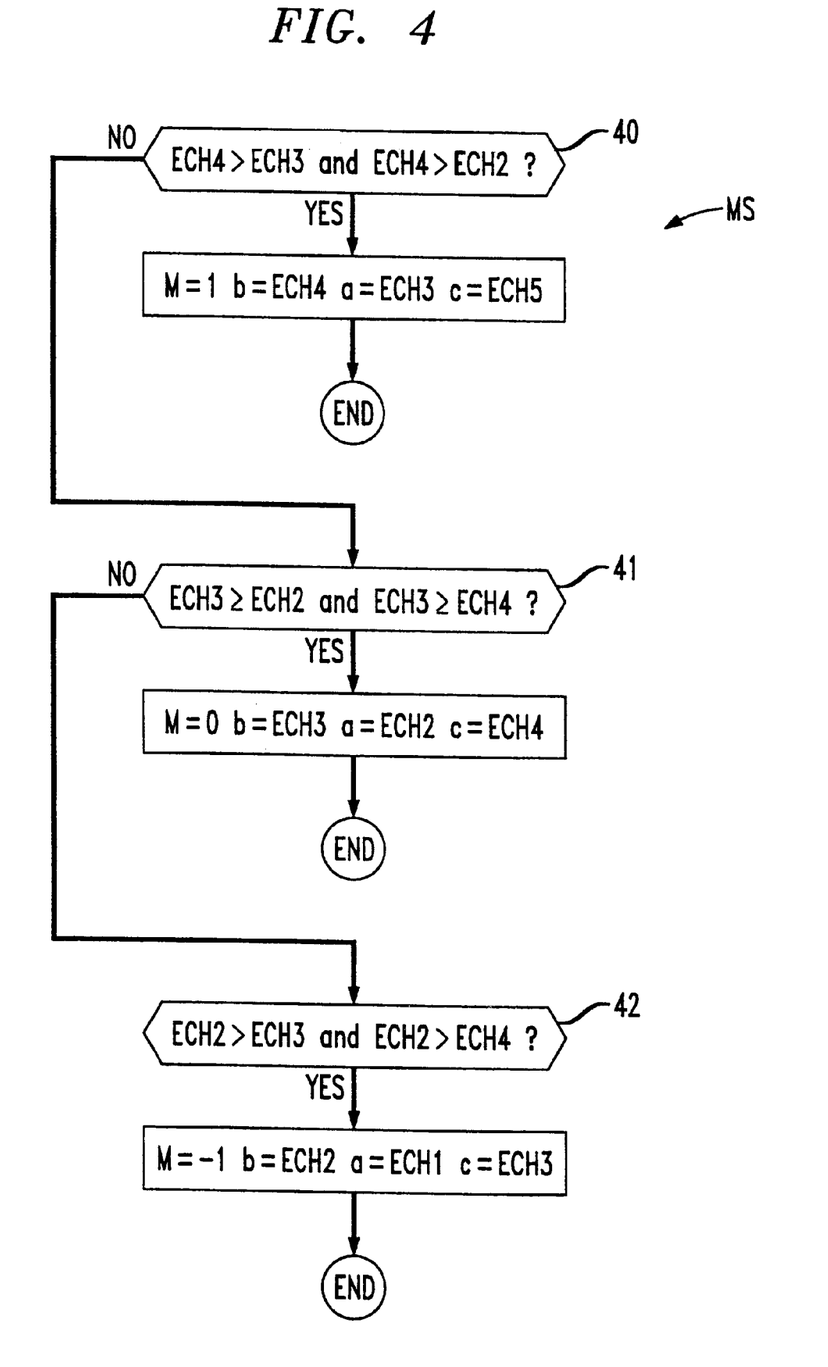
FIG. 4 is a flowchart illustrating the selection carried out by the selection means incorporated in the processing means of the device according to the invention.

The selection algorithm implemented in this means which may, for example, be embodied in software within a microprocessor, is illustrated in FIG. 4. More precisely, this algorithm includes mutually comparing the samples ECH2, ECH3 and ECH4. More precisely, if ECH4 is greater than ECH3 and if ECH4 is greater than ECH2 (step 40), then the sample having the largest value (b) is the sample ECH4 and the two samples flanking it are the samples ECH3 and ECH5. If, on the other hand, the sample ECH3 is greater than or equal to the sample ECH2 and also greater than or equal to the sample ECH4 (step 41), then b is equal to ECH3, a is equal to ECH2 and c is equal to ECH4. Finally, if the sample ECH2 is greater than the sample ECH3 and the sample ECH4 (step 42), then b is equal to ECH2, a is equal to ECH1 and c is equal to ECH3.

The means of parabolic interpolation MIP will then use the values a, b and c to perform a parabolic interpolation between these three samples to determine the maximum MAX of the cross-correlation function and consequently the time gap dT separating this maximum from the sample b (FIG. 2a). This time gap dT is defined by the following formula:

$$dT = (c-a)/(2(2b-a-c)) \tag{II}$$

In the case where, as illustrated in FIG. 2, the sample of the cross-correlation function having the largest value (i.e., sample b) corresponds to a zero reference time gap, the mutual time gap T between the two sampled signals A+C and B+D is then equal to dT. However, in the case where the sample b corresponds to the reference time gap equal to $-D'$ or to $+D'$, account should be taken thereof for the determination of the time gap T. One should also verify that the value D' has been chosen in such a way that, regardless of the mutual time gap between the secondary signals A+C and B+D, one always has the sample b corresponding either to the reference time gap $-D'$, or to $+D'$, or to 0.

Thus, in a general manner, the mutual time gap T is defined by the following formula:

$$T = M + (c-a)/(2(2b-a-c)) \tag{III}$$

In this formula, M denotes an integer which can take the value $-1$, 0 or $+1$. This value $-1$, 0 or $+1$ is defined by the selection means MS. Thus, if one refers again to FIG. 4, it can be seen that if the sample b is the sample ECH4, M will take the value 1. On the other hand, if the sample b corresponds to the sample ECH3, M will take the value 0, and if the sample b corresponds to the sample ECH2, M will take the value $-1$. It follows from the formula (III) that the mutual time gap T between the two secondary signals A+C and B+D is equal to the ratio P/Q, where P and Q are defined by the following formulae, respectively:

$$P = (c-a+2M(2b-a-c)) \tag{IV}$$

$$Q = 2(2b-a-c) \tag{V}$$

The hardware structure of the interpolation means MIP may be embodied as illustrated in FIG. 3 using adders and multipliers. The means MIP may thus be embodied in software within a microprocessor or else in integrated circuit form. Thus, every 8.33 ns (corresponding to the sampling frequency 120 MHZ), the means MIP delivers a value of the signal P and a value of the signal Q. These two values are divided in a divider DIV to yield the sought-after mutual time gap T. This division is advantageously performed for reasons of accuracy in "floating binary".

The positioning error TE is then equal to the product of the time gap T multiplied by the estimated speed of rotation. This estimated speed of rotation is obtained, for example, by counting the number of zero crossings of the overall signal A+B+C+D during a certain number of samples, which is typically 88,000 at 120 MHz. This estimation of the speed of rotation also makes it possible to correct the value of the base time gap D'.

The successive samples of the numerators P and of the denominators Q will respectively form a first sampled input signal P and a second sampled input signal Q. The post-processing means MPST will then formulate from these two sampled input signals a first binary output signal TZC representative of the possible overstepping of the portion of track by the incident signal. It will also formulate a second binary output signal DIR representative of the direction of overstepping of the portion of track by the incident signal.

Specifically, the signal P is equal to zero whenever the positioning error TE is zero and can therefore be used as the signal TZC. The signal Q, which depends directly on the width of the frequency band, is a maximum when the laser spot is on the track and a minimum when the laser spot lies between two portions of track. It may therefore act as the "mirror" signal. Stated otherwise, the invention is here noteworthy in the sense that the signals P and Q are always in quadrature so that they possess the same properties as the TZC and "mirror" signals used in the prior art. However, in the present case, the sampled signals P and Q arrive from the same processing block, namely the interpolation means MIP. They may therefore undergo identical filtering processings without any risk of disturbing the measurement.

Figure 5:
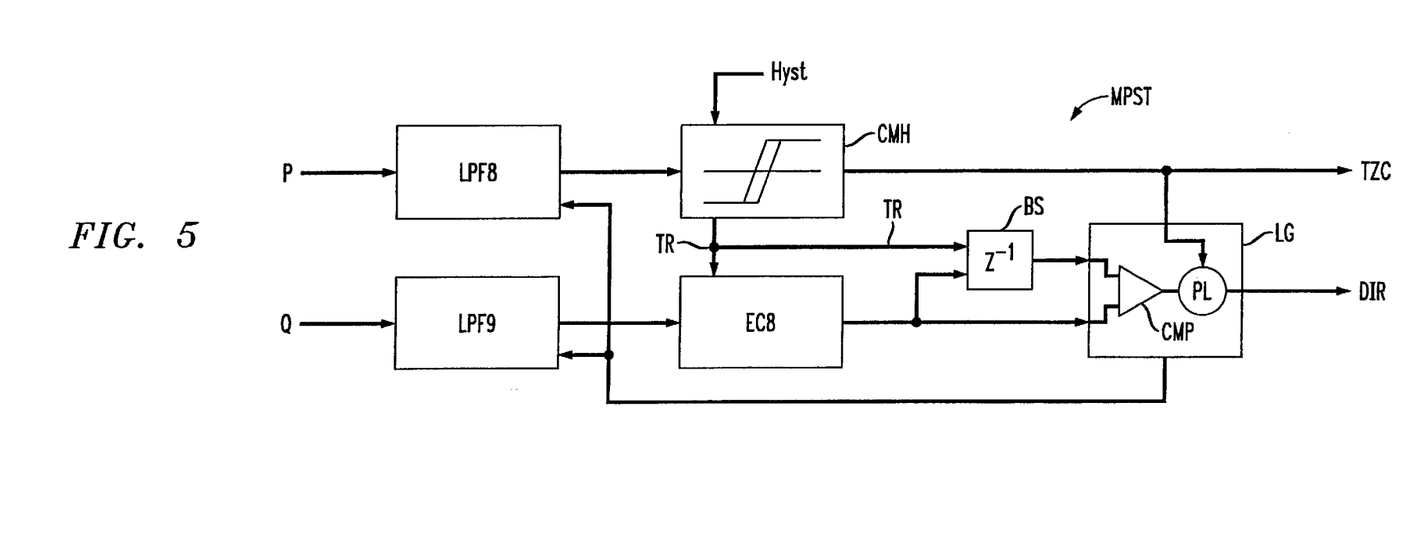
FIG. 5 is a more detailed schematic diagram of the internal architecture of post-processing means of the device of FIG. 1.
Figure 5A:
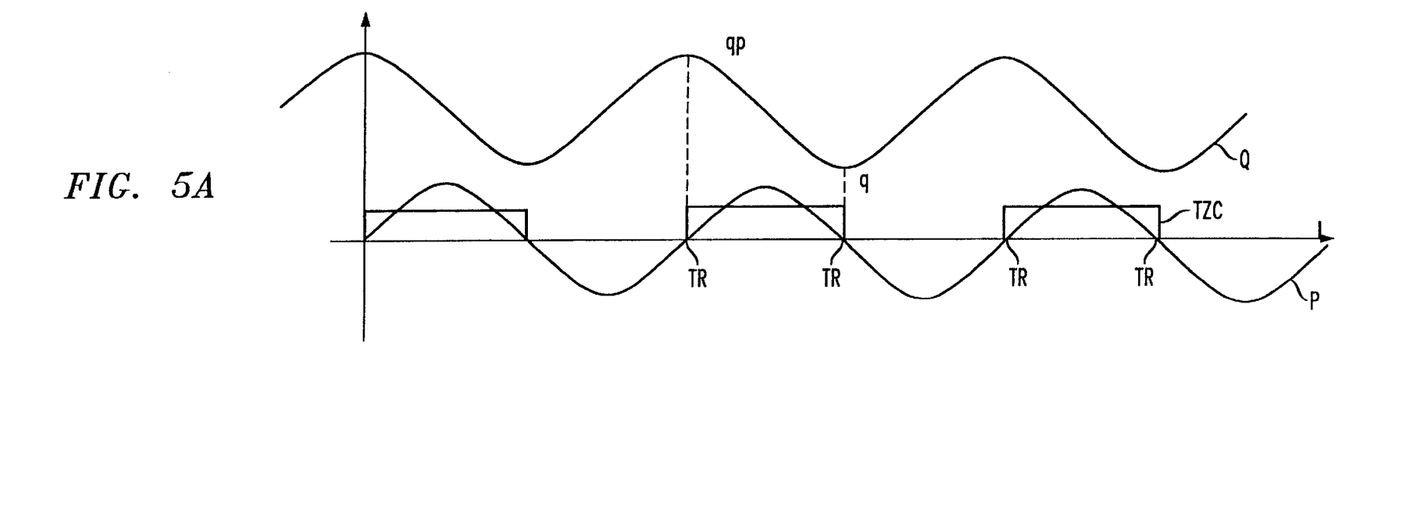
FIG. 5a is a graph of the input signals processed by the post-processing means as well as one of the output signals delivered by the post-processing means.

As illustrated in FIG. 5a, the signal P will be used to define the signal TZC. More precisely, the detection of each transition TR of the signal P with respect to a predetermined threshold (e.g., the value zero) will be representative of the possible overstepping of a portion of track by the incident signal. Thus, the signal TZC will be a binary sampled signal alternately taking the values $-1$ or 0 with each overstepping of the threshold by the signal P. Hardware-wise, the signal TZC is obtained, as illustrated in FIG. 5, by comparing the signal P in a hysteresis comparator CMH, which may be of a structure known in the art. The value of the hysteresis Hyst may be, for example, equal to ⅛ of the amplitude of the signal P.

The second binary output signal DIR is defined by the following formula:

$$DIR = (\text{Sign}\,(q-qp))\,XOR\,(TZC) \quad\quad (VI)$$

in which the operator XOR denotes the "exclusive OR" logic function. In this formula, q denotes the amplitude of the signal Q at each current transition TR of the signal P, while qp denotes the amplitude of this signal Q at the previous transition TR of the signal P. Thus, the signal DIR will take either the value 0 or the value 1 depending on the direction of overstepping of the portion of track.

With respect to hardware, the post-processing means may include a first input for receiving the first sampled input signal P and a second input for receiving the second sampled input signal Q. The post-processing means MPST may also include a transition detection means, namely the hysteresis comparator CMH, connected to the first input and able to detect each transition TR of the input signal P and to deliver the first binary output signal TZC.

This means also includes a sample-and-hold module ECB, which may be of a structure known in the art, connected to the second input and to the transition detection means CMH. This sampler is able to store the amplitude of the second input signal Q at each detected current transition TR of the first input signal P.

The means MPST also includes a flip-flop BS, controlled by the transitions TR of the first input signal P, that is connected to the output of the sample-and-hold module ECB. This flip-flop is intended for storing the amplitude of the second input signal Q at the previous transition of the first input signal.

A logic block LG formulates the second binary output signal DIR. This logic block LG includes a comparator CMP whose two inputs are respectively linked to the output of the flip-flop BS and to the output of the sample-and-hold module ECB. The logic block LG also includes an exclusive OR logic gate PL, an input of which is linked to the output of the comparator CMP and the other input of which receives the first output signal TZC. The output of the logic gate PL delivers the second binary output signal DIR.

Apart from the means which have just been described, it is particularly advantageous also to provide in the post-processing means MPST two low-pass filters LPF8 and LPF9 of a type with infinite impulse response for filtering the signals P and Q before their processing. The cutoff frequency of these two filters is advantageously adjusted as a function of the frequency of overstepping of the portions of track which is a signal delivered by the logic block LG. Thus, one will advantageously choose a cutoff frequency of the order of 100 KHz for the low-pass filters when the frequency of overstepping of the portions of track is less than 50 KHz (i.e., start of the motion of the carriage). On the other hand, one will choose a cutoff frequency on the order 600 KHz for the low-pass filters when the frequency of overstepping of the portions of track is greater than 50 KHz.

Apart from the advantages just described, the system according to the invention also allows better mastery of the detection of the transitions when one commences a movement of the carriage and also makes it possible to easily determine the changes of direction of overstepping of portions of track. It is in fact sufficient to store in memory not only the value of the amplitude of the signal Q at the previous transition but also the value at the transition preceding this previous transition. If qpp denotes the amplitude of the signal Q two transitions before a current transition, then any change of direction of overstepping will be detected whenever the absolute value of the difference (q−qp) is less than the absolute value of the difference (q−qpp).

That which is claimed is:

1. A method for controlling the position of an optical beam incident on a track of a rotationally mobile disc comprising:
    receiving an optical beam reflected by the disc using an optical pick-up comprising a plurality of photodetectors each providing an elementary signal; and
    determining a positioning error of the reflected optical beam with respect to the track from the elementary signals by
        formulating two sampled secondary signals from the elementary signals having a mutual time gap representative of the positioning error, and
        determining successive current values of the mutual time gap at a sampling frequency by searching for successive current maximums of a cross-correlation function between the two sampled secondary signals at the sampling frequency.

2. The method according to claim 1 wherein determining successive current values comprises:
    searching for each current maximum of the cross-correlation function based upon a set of samples of the cross-correlation function corresponding to a set of reference time gaps; and
    determining a time gap corresponding to each current maximum to provide the current value of the mutual time gap between the two sampled secondary signals.

3. The method according to claim 2 wherein each reference time gap is an integer multiple of a base time gap; wherein one of the reference time gaps is zero and the remaining time gaps are pairwise equal and of opposite sign; and wherein the base time gap is based upon a frequency band including the two sampled secondary signals.

4. The method according to claim 3 wherein the set of time gaps comprises five time gaps; and wherein the base time gap is less than an inverse of a width of the frequency band.

5. The method according to claim 2 wherein determining the time gap comprises:
    selecting from among the samples of the cross-correlation function a largest sample and two samples flanking the largest sample;
    performing a parabolic interpolation of the largest sample and the two flanking samples to provide at least two factors; and
    calculating a ratio between the at least two factors.

6. The method according to claim 5 further comprising:
    formulating a first binary output signal representative of a potential overstepping of a portion of the track by the incident optical beam based upon numerators of successive calculated ratios; and
    formulating a second binary output signal representative of a direction of overstepping of the portion of the track by the incident optical beam based upon the numerators and denominators of the successive calculated ratios.

7. A method for determining a positioning error of an optical beam incident on a track of a rotationally mobile carrier based upon a plurality of elementary signals determined from a reflected optical beam, the method comprising:
    formulating at least two sampled secondary signals from the elementary signals having a mutual time gap representative of the positioning error; and
    determining successive current values of the mutual time gap at a sampling frequency by searching for successive current maximums of a cross-correlation function between the at least two sampled secondary signals at the sampling frequency.

8. The method according to claim 7 wherein determining successive current values comprises:
   searching for each current maximum of the cross-correlation function based upon a set of samples of the cross-correlation function corresponding to a set of reference time gaps; and
   determining a time gap corresponding to each current maximum to provide the current value of the mutual time gap between the at least two sampled secondary signals.

9. The method according to claim 8 wherein each reference time gap is an integer multiple of a base time gap; wherein one of the reference time gaps is zero and the remaining reference time gaps are pairwise equal and of opposite sign; and wherein the base time gap is based upon a frequency band including the at least two sampled secondary signals.

10. The method according to claim 9 wherein the set of time gaps comprises five time gaps; and wherein the base time gap is less than an inverse of a width of the frequency band.

11. The method according to claim 8 wherein determining the time gap comprises:
   selecting from among the samples of the cross-correlation function a largest sample and two samples flanking the largest sample;
   performing a parabolic interpolation of the largest sample and the two flanking samples to provide at least two factors; and
   calculating a ratio between the at least two factors.

12. The method according to claim 11 further comprising:
   formulating a first binary output signal representative of a potential overstepping of a portion of the track by the incident optical beam based upon numerators of successive calculated ratios; and
   formulating a second binary output signal representative of a direction of overstepping of the portion of the track by the incident optical beam based upon the numerators and denominators of the successive calculated ratios.

13. A device for controlling the position of an optical beam incident on a track of a rotationally mobile disc comprising:
   a pick-up for picking up an optical beam reflected by the disc comprising a plurality of photodetectors each providing an elementary signal; and
   a controller for determining a positioning error of the reflected optical beam with respect to the track from the elementary signals, said controller comprising
      a preprocessor for formulating from the elementary signals two sampled secondary signals having a mutual time gap therebetween representative of the positioning error,
      a cross-correlator for performing a cross-correlation function between the two sampled secondary signals at a sampling frequency, and
      a processor for determining successive current values of the mutual time gap by searching at the sampling frequency for successive current maximums of the cross-correlation function between the two sampled secondary signals.

14. The device according to claim 13 wherein said cross-correlator comprises:
   at least one delay circuit for receiving the two sampled secondary signals and providing at least two temporally mutually shifted sampled secondary signals;
   a plurality of multipliers connected to said at least one delay circuit providing at respective outputs thereof a set of sampled intermediate signals respectively based upon products of the at least two temporally mutually shifted sampled secondary signals and plurality of reference time gaps;
   a plurality of low-pass filters respectively connected to the outputs of said plurality of multipliers; and
   a storage device connected to said plurality of low-pass filters and storing successive sets of samples of the cross-correlation function which are respectively associated with the plurality of reference time gaps.

15. The device according to claim 14 wherein said processor searches for each current maximum of the cross-correlation function based upon each set of samples stored in said storage device; and wherein said processor determines a time gap corresponding to each current maximum to provide the current value of the mutual time gap between the two sampled secondary signals.

16. The device according to claim 14 wherein said cross-correlator has first and second inputs for respectively receiving the two sampled secondary signals; wherein said plurality of multipliers comprise five multipliers each having a first input and a second input; and wherein said at least one delay circuit comprises a chain of four delay elements each providing a delay equal to a base time gap and a fifth delay element providing a delay equal to twice the base time gap.

17. The device according to claim 16 wherein the first input of each multiplier is connected to the first input of said cross-correlator by the fifth delay element; wherein a first end of said chain of four delay elements and the second input of one of said multipliers are connected to the second input of said cross-correlator; wherein the second input of another multiplier is connected to a second end of said chain of delay elements; and wherein the second inputs of the remaining three multipliers are respectively connected to three intermediate points of said chain of delay elements.

18. The device according to claim 16 wherein the base time gap is less than an inverse of a width of a frequency band including the two sampled secondary signals.

19. The device according to claim 14 wherein said processor comprises:
   a selector for selecting from among the samples stored in said storage device a largest sample and two samples flanking the largest sample; and
   an interpolater for performing parabolic interpolation of the largest and two flanking samples to provide at least two factors and calculating a ratio between the at least two factors to provide the current value of the mutual time gap between the two sampled secondary signals.

20. The device according to claim 19 further comprising a post-processor for formulating a first binary output signal from numerators of successive calculated ratios representative of a potential overstepping of a portion of the track by the incident optical beam; and wherein said post-processor also formulates a second binary output signal from the numerators and from denominators of the successive calculated ratios representative of a direction of overstepping of the portion of track by the incident optical beam.

21. The device according to claim 20 wherein said post-processor comprises:
   a detector receiving a first sampled input signal based upon the numerators of the successive calculated ratios for detecting each transition of the first sampled input signal and providing the first binary output signal;
   a sample-and-hold module receiving a second sampled input signal based upon the denominators of the successive calculated ratios and being connected to said detector, said sample-and-hold module storing an amplitude of the second sampled input signal at each detected current transition of the first input signal;

a flip-flop connected to said sample-and-hold module and controlled by the detected transitions of the first input signal, said flip-flop storing the amplitude of the second sampled input signal at a previous transition of the first sampled input signal; and a logic module comprising
a comparator having two inputs respectively connected to said flip-flop and said sample-and-hold module and an output,
an exclusive OR logic gate having a first input connected to the output of said comparator, a second input receiving the first binary output signal, and an output providing the second binary output signal.

22. A controller for determining a positioning error of an optical beam incident on a track of a rotationally mobile carrier based upon a plurality of elementary signals determined from a reflected optical beam, the controller comprising:

a preprocessor for formulating from the elementary signals at least two sampled secondary signals having a mutual time gap therebetween representative of the positioning error;

a cross-correlator for performing a cross-correlation function between the at least two sampled secondary signals at a sampling frequency; and a processor for determining successive current values of the mutual time gap by searching at the sampling frequency for successive current maximums of the cross-correlation function between the at least two sampled secondary signals.

23. The controller according to claim 22 wherein said cross-correlator comprises:

at least one delay circuit for receiving the at least two sampled secondary signals and providing at least two temporally mutually shifted sampled secondary signals;

a plurality of multipliers connected to said at least one delay circuit providing at respective outputs thereof a set of sampled intermediate signals respectively based upon products of the at least two temporally mutually shifted sampled secondary signals and plurality of reference time gaps;

a plurality of low-pass filters respectively connected to the outputs of said plurality of multipliers; and a storage device connected to said plurality of low-pass filters and storing successive sets of samples of the cross-correlation function which are respectively associated with the plurality of reference time gaps.

24. The controller according to claim 23 wherein said processor searches for each current maximum of the cross-correlation function based upon each set of samples stored in said storage device; and wherein said processor determines a time gap corresponding to each current maximum to provide the current value of the mutual time gap between the at least two sampled secondary signals.

25. The controller according to claim 23 wherein said cross-correlator has first and second inputs for respectively receiving the at least two sampled secondary signals; wherein said plurality of multipliers comprise five multipliers each having a first input and a second input; and wherein said at least one delay circuit comprises a chain of four delay elements each providing a delay equal to a base time gap and a fifth delay element providing a delay equal to twice the base time gap.

26. The controller according to claim 25 wherein the base time gap is less than an inverse of a width of a frequency band including the at least two sampled secondary signals.

27. The controller according to claim 23 wherein said processor comprises:

a selector for selecting from among the samples stored in said storage device a largest sample and two samples flanking the largest sample; and an interpolater for performing parabolic interpolation of the largest and two flanking samples to provide at least two factors and calculating a ratio between the at least two factors to provide the current value of the mutual time gap between the at least two sampled secondary signals.

28. The controller according to claim 27 further comprising a post-processor for formulating a first binary output signal from numerators of successive calculated ratios representative of a potential overstepping of a portion of the track by the incident optical beam; and wherein said post-processor also formulates a second binary output signal from the numerators and from denominators of the successive calculated ratios representative of a direction of overstepping of the portion of track by the incident optical beam.

29. A digital disc reader comprising:

a beam generator for directing an optical beam at a track of the digital disc;

a pick-up for picking up an optical beam reflected by the disc comprising a plurality of photodetectors each providing an elementary signal; and a controller for determining a positioning error of the reflected optical beam with respect to the track from the elementary signals, said controller comprising
a preprocessor for formulating from the elementary signals at least two sampled secondary signals having a mutual time gap therebetween representative of the positioning error,
a cross-correlator for performing a cross-correlation function between the at least two sampled secondary signals at a sampling frequency, and
a processor for determining successive current values of the mutual time gap by searching at the sampling frequency for successive current maximums of the cross-correlation function between the at least two sampled secondary signals.

30. The device according to claim 29 wherein said cross-correlator comprises:

at least one delay circuit for receiving the at least two sampled secondary signals and providing at least two temporally mutually shifted sampled secondary signals;

a plurality of multipliers connected to said at least one delay circuit providing at respective outputs thereof a set of sampled intermediate signals respectively based upon products of the at least two temporally mutually shifted sampled secondary signals and plurality of reference time gaps;

a plurality of low-pass filters respectively connected to the outputs of said plurality of multipliers; and a storage device connected to said plurality of low-pass filters and storing successive sets of samples of the cross-correlation function which are respectively associated with the plurality of reference time gaps.

31. The device according to claim 30 wherein said processor searches for each current maximum of the cross-correlation function based upon each set of samples stored in said storage device; and wherein said processor determines a time gap corresponding to each current maximum to provide the current value of the mutual time gap between the at least two sampled secondary signals.

32. The device according to claim 30 wherein said cross-correlator has first and second inputs for respectively receiving the at least two sampled secondary signals; wherein said plurality of multipliers comprise five multipliers each having a first input and a second input; and wherein said at least one delay circuit comprises a chain of four delay elements each providing a delay equal to a base time gap and a fifth delay element providing a delay equal to twice the base time gap.

33. The device according to claim 32 wherein the base time gap is less than an inverse of a width of a frequency band including the at least two sampled secondary signals.

34. The device according to claim 30 wherein said processor comprises:

a selector for selecting from among the samples stored in said storage device a largest sample and two samples flanking the largest sample; and an interpolater for performing parabolic interpolation of the largest and two flanking samples to provide at least two factors and calculating a ratio between the at least two factors to provide the current value of the mutual time gap between the at least two sampled secondary signals.

35. The device according to claim 34 further comprising a post-processor for formulating a first binary output signal from numerators of successive calculated ratios representative of a potential overstepping of a portion of the track by the incident optical beam; and wherein said post-processor also formulates a second binary output signal from the numerators and from denominators of the successive calculated ratios representative of a direction of overstepping of the portion of track by the incident optical beam.

* * * * *